US011636266B2

(12) United States Patent
Pappu et al.

(10) Patent No.: US 11,636,266 B2
(45) Date of Patent: *Apr. 25, 2023

(54) SYSTEMS AND METHODS FOR UNSUPERVISED NEOLOGISM NORMALIZATION OF ELECTRONIC CONTENT USING EMBEDDING SPACE MAPPING

(71) Applicant: Yahoo Assets LLC, Dulles, VA (US)

(72) Inventors: Aasish Pappu, New York, NY (US); Kapil Thadani, New York, NY (US); Nasser Zalmout, Abu Dhabi (AE)

(73) Assignee: Yahoo Assets LLC, New York, NY (US)

(*) Notice: Subject to any disclaimer, the term of this patent is extended or adjusted under 35 U.S.C. 154(b) by 204 days.

This patent is subject to a terminal disclaimer.

(21) Appl. No.: 17/021,824

(22) Filed: Sep. 15, 2020

(65) Prior Publication Data
US 2020/0410169 A1 Dec. 31, 2020

Related U.S. Application Data

(63) Continuation of application No. 16/175,533, filed on Oct. 30, 2018, now Pat. No. 10,810,373.

(51) Int. Cl.
*G06F 17/00* (2019.01)
*G06F 40/284* (2020.01)
(Continued)

(52) U.S. Cl.
CPC ............ *G06F 40/284* (2020.01); *G06F 16/31* (2019.01); *G06F 16/3344* (2019.01);
(Continued)

(58) Field of Classification Search
None
See application file for complete search history.

(56) References Cited

U.S. PATENT DOCUMENTS 7,788,084 B2 8/2010 Brun
8,788,263 B1* 7/2014 Richfield ............... G06F 40/205
704/9
(Continued)

OTHER PUBLICATIONS

Cabré, Maria Teresa, et al., "Stratégie Pour La Semi-Automatique des Néologismes de Presse", TTR: Traduction, Terminologie, Redaction, www.erudit.org/, vol. 8, No. 2, (1995), pp. 89-100.
(Continued)

*Primary Examiner* — Satwant K Singh
(74) *Attorney, Agent, or Firm* — Bookoff McAndrews, PLLC

(57) ABSTRACT

Systems and methods are disclosed for utilizing a comment moderation bot for detecting and normalizing neologisms in social media. One method comprises transmitting, by a neologism normalization system, a comment moderation bot for detecting neologisms on an online platform maintained by one or more publisher systems. The comment moderation bot may aggregate data related to user comments and transmit the aggregated data to the neologism normalization system for further processing. The neologism normalization system implements unsupervised machine learning models for detecting neologisms in the aggregated data through tokenization and filtering; and normalizing the neologisms through similarity analysis and lattice decoding.

20 Claims, 3 Drawing Sheets

(51) Int. Cl.
*G06N 20/00* (2019.01)
*G06F 16/31* (2019.01)
*G06F 16/33* (2019.01)
*G06F 40/30* (2020.01)
*G06F 40/232* (2020.01)
*G06F 40/295* (2020.01)

(52) U.S. Cl.
CPC .......... *G06F 40/232* (2020.01); *G06F 40/295* (2020.01); *G06F 40/30* (2020.01); *G06N 20/00* (2019.01)

(56) References Cited

U.S. PATENT DOCUMENTS

| | | | |
|---|---|---|---|
| 9,275,041 | B2 | 3/2016 | Ghosh |
| 9,563,693 | B2 | 2/2017 | Zhang |
| 9,715,493 | B2 | 7/2017 | Papadopoullos |
| 9,805,018 | B1 * | 10/2017 | Richfield ............ G06F 16/9535 |
| 10,382,367 | B2 | 8/2019 | Pappu |
| 10,628,737 | B2 | 4/2020 | Cohen |
| 10,810,373 | B1 * | 10/2020 | Pappu ................... G06F 40/284 |
| 2012/0089400 | A1 * | 4/2012 | Henton ................... G10L 13/02 704/260 |
| 2016/0307114 | A1 | 10/2016 | Ghosh |
| 2018/0004718 | A1 | 1/2018 | Pappu |
| 2018/0285459 | A1 | 10/2018 | Soni |

OTHER PUBLICATIONS

Renouf, Antoinette, "Sticking To The Text: A Corpus Linguist's View of Language." *Aslib Proceedings*. vol. 45. No. 5. MCB UP Ltd, 1993.

Kerremans, Daphné, et al., "The NeoCrawler: Identifying and Retrieving Neologisms From The Internet Abstract and Monitoring Ongoing Change." *Current Methods in Historical Semantics*, Berlin etc.: De Gruyter Mouton (2012), pp. 59-96.

Gérard, Christophe et al., "Traitement Automatisé De La Néologie: Pourquoi Et Comment Intégrer Translation L'analyse Thématique." *SHS Web of Conferences, EDP Sciences*, vol. 8, (2014), pp. 2627-. 2646.

Cartier, Emmanuel, "Neoveille, A Web Platform for Neologism Tracking." Proceedings of the Software Abstract Demonstrations of the 15th Conference of the European Chapter of the Association for Computational Linguistics., *Classiques Garnier* (2016), p. 101-131.

Falk, Ingrid, et al., "From Non Word To New Word: Automatically Identifying Neologisms In French Newspapers." *LREC-The 9th Edition Of The Language Resources and Evaluation Conference*, (2014).10 pages.

Stenetorp, Pontus, Automated Extraction Of Swedish Neologisms Using A Temporally Annotated Corpus, *Royal Institute of Technology*, www.kth_se/csc, (2010), 69 pages.

* cited by examiner

SYSTEMS AND METHODS FOR UNSUPERVISED NEOLOGISM NORMALIZATION OF ELECTRONIC CONTENT USING EMBEDDING SPACE MAPPING

CROSS-REFERENCE TO RELATED APPLICATION(S)

This patent application is a continuation of and claims the benefit of priority to U.S. Nonprovisional patent application Ser. No. 16/175,533, filed on Oct. 30, 2018, the entirety of which is incorporated herein by reference.

TECHNICAL FIELD

The present disclosure relates to normalizing neologisms and, more particularly, to systems and methods for utilizing a comment moderation bot for detecting and normalizing neologisms in social media.

BACKGROUND

Linguistic evolution and word coinage are naturally occurring phenomena in languages. The recent social media outbreak, however, has expedited such processes through its informal social nature, and mainly written content. One aspect of this change is the increasing use of neologisms. Neologisms are relatively recent terms that are used widely, and may be in the process of entering common use, but have not yet been fully accepted into mainstream language. Neologisms are rarely found in traditional dictionaries or language lexica. And they usually share semantic, lexical, and phonetic similarities to some relevant canonical forms. They are also often, but not necessarily, generated through coinage of two different words into single entity. Examples include the word burkini, which is coined from the words burka and bikini. The burkini has its own individual meaning that cannot be entailed by burka or bikini alone.

Social media streams are noisy by nature, as such the process of neologism normalization extends to both intentional and accidental non-standard content. Social media lexical phenomena are also evolving rapidly, beyond the scope of traditional dictionary extension processes. Moreover, neologisms are usually related to certain timeframes, as such, the use of certain terms might decline at some point without entering common linguistic lexica. The semantics of these terms might also shift, given updates to the contexts in which they are used. The means for detecting neologisms through machine learning should be dynamic and relatively inexpensive. Therefore, supervised approaches fall short, since resources for such tasks are expensive to develop and update to match current neologisms or neologisms coinage patterns.

Accordingly, solutions are needed for inexpensively detecting and normalizing neologisms identified in online platforms. Thus, the present disclosure is directed to electronically detecting and normalizing neologisms without explicit supervised resources.

SUMMARY OF THE DISCLOSURE

Embodiments of the present disclosure include systems and methods for unsupervised neologism normalization using embedding space mapping.

According to certain embodiments, computer-implemented methods are disclosed for unsupervised neologism normalization. One method includes detecting one or more user generated comments on a publisher platform; tokenizing the one or more user generated comments; filtering the one or more user generated comments against known lexemes stored in a database and removing the known lexemes from further analysis; selecting a language and auditing the one or more user generated comments for lexemes in order to identify and remove foreign lexemes from further analysis; generating a list of remaining lexemes as a result of the filtered and audited one or more user generated comments; identifying sub-lexemes from the list of remaining lexemes; normalizing the list of remaining lexemes through lattice decoding; and storing the normalized list of remaining lexemes in a neologism database.

According to certain embodiments, systems for unsupervised neologism normalization. One system includes a processor configured to execute the instructions to perform a method including: detecting one or more user generated comments on a publisher platform; tokenizing the one or more user generated comments; filtering the one or more user generated comments against known lexemes stored in a database and removing the known lexemes from further analysis; selecting a language and auditing the one or more user generated comments for lexemes in order to identify and remove foreign lexemes from further analysis; generating a list of remaining lexemes as a result of the filtered and audited one or more user generated comments; identifying sub-lexemes from the list of remaining lexemes; normalizing the list of remaining lexemes through lattice decoding; and storing the normalized list of remaining lexemes in a neologism database.

According to certain embodiments, non-transitory computer readable medium for unsupervised neologism normalization. One non-transitory computer readable medium includes: a processor configured to execute the instructions to perform a method including: detecting one or more user generated comments on a publisher platform; tokenizing the one or more user generated comments; filtering the one or more user generated comments against known lexemes stored in a database and removing the known lexemes from further analysis; selecting a language and auditing the one or more user generated comments for lexemes in order to identify and remove foreign lexemes from further analysis; generating a list of remaining lexemes as a result of the filtered and audited one or more user generated comments; identifying sub-lexemes from the list of remaining lexemes; normalizing the list of remaining lexemes through lattice decoding; and storing the normalized list of remaining lexemes in a neologism database.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
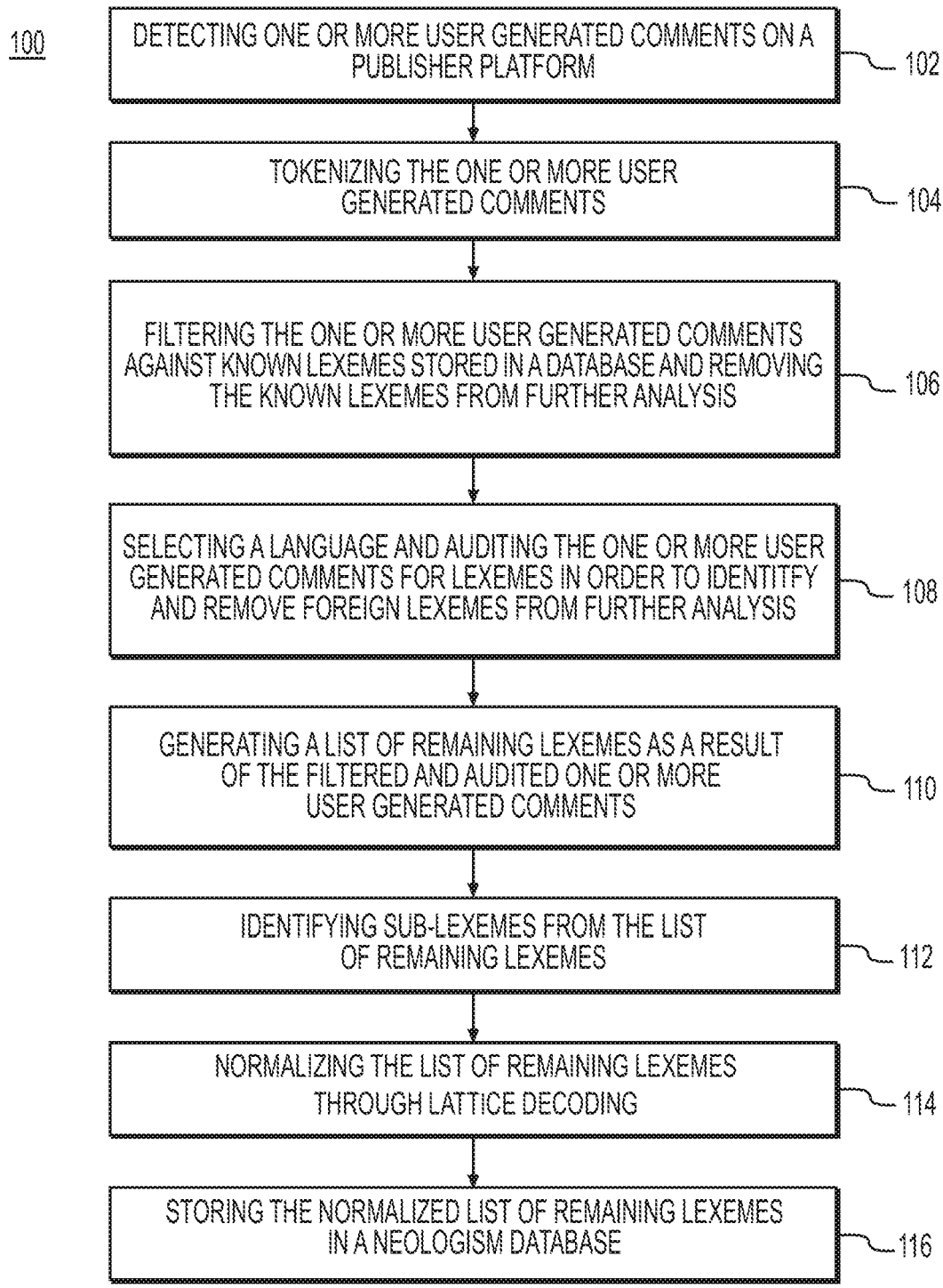
FIG. 1 depicts a flow diagram of an exemplary method of detecting and normalizing neologisms identified on an online platform.

While principles of the present disclosure are described herein with reference to illustrative embodiments for particular applications, it should be understood that the disclosure is not limited thereto. Those having ordinary skill in the art and access to the teachings provided herein, will recognize that the features illustrated or described with respect to one embodiment, may be combined with the features of another embodiment. Therefore, additional modifications, applications, embodiments, and substitution of equivalents, all fall within the scope of the embodiments described herein. Accordingly, the invention is not to be considered as limited by the foregoing description. Various non-limiting embodiments of the present disclosure will now be described to provide an overall understanding of the principles of the structure, function, and use of system and method for unsupervised neologism using embedding space mapping.

As described above, there is a need in the field of neologism normalization for unsupervised processes for detecting and normalizing neologisms identified in online platforms. The past contributions for automatic neologism handling, whether for detection or normalization, are relatively scarce. Existing neologisms detection approaches rely solely on exclusions lists of canonical or accepted lexemes to filter plausible neologisms or utilize additional filters like eliminating lexemes with spelling errors or named entities, to further reduce the set of detected plausible neologisms. Other modern neologism normalization techniques implement supervised machine learning models, which are inefficient because they require relatively large datasets and are expensive to maintain.

Therefore, automated methods for handling neologisms are important for natural language understanding and normalization, especially for socially generated content. Accordingly, the present disclosure is directed to an unsupervised approach into detecting neologisms and non-standard words, and then normalizing those detected neologisms and non-standard words without the need of explicit supervised resources. In particular, unsupervised normalization machine learning models are ideal. Accordingly, the following embodiments outline unsupervised machine learning models that implement instructions for analyzing distributed lexemes embeddings captured from online content, where the embeddings are used to capture the notion of contextual similarity between canonical and noisy lexemes, along with other metrics and implement phrase-based modeling, using existing phrase corpora.

In one embodiment, the initial step of neologism detection for a neologism normalization system transmits a comment moderation bot for detecting neologisms on an online platform maintained by one or more publisher systems. For example, here, a comment moderation bot may aggregate text posted on the landing page of webpage and transmit the aggregated text data packets back to the neologism normalization system for further analysis.

In one embodiment, the analysis may further comprise: tokenization of the aggregated text data wherein code may be executed for implementing white space splits, identification of Uniform Resource Locators, and specific punctuation patterns; named entities removal, wherein an algorithm analyzes the received aggregated text data packets and identifies relevant nouns (e.g., people, places, and organizations) that are mentioned in the text and further eliminates the named entities from the list; non-language (e.g., English) content removal, wherein code is executed for identifying and eliminating foreign (e.g., non-English) lexemes (e.g., phrases, tokens, and words); social media jargon removal, wherein code is executed for accessing social media platform specific glossaries and identifying and removing known social media jargon; and the identification of spelling errors and the potential removal thereof.

The analysis of the received aggregated text data packets may additionally include a neologism normalization process, wherein the unsupervised machine learning model receives an input of corpora, mathematically detects similarities between lexemes (taking into consideration the context of the lexemes) corresponding to the corpora and outputs a feature vector (i.e., lexeme embedding) assigned to each lexeme. The unsupervised machine learning model then uses the lexeme embeddings to gain a broader understanding of normalization lexicons and further uses the lexicons to obtain scored normalization candidates for each neologism that is ultimately identified.

The analysis of the received aggregated text data packets may further include computer-implemented instructions for lexicon normalization and lattice decoding using a list of canonical word forms as canonical candidates. This list of canonical forms can be obtained for a particular language, (e.g., from traditional English language lexica like the Gigaword corpus). For each canonical candidate, the unsupervised machine learning model may retrieve the N nearest neighbors from the lexeme embeddings. This effectively functions as a reversed normalization lexicon, where the canonical candidates are mapped to the potential neologisms. The canonical forms may be scored using several similarity metrics and the unsupervised machine learning model may then utilize reverse mapping techniques to get a list of scored canonical candidates for each neologism. Neologisms are expected to share semantic, lexical, and phonetic similarity with their canonical counterparts. As such, as will be described with respect to FIG. 2, normalization may involve the calculation of semantic, lexical, and phonetic similarity scores. In one embodiment, the following algorithms reflect examples of equations suitable for the calculation of such similarity domains:

One example of a semantic similarity score may be calculated using cosine distance, as follows:

$$\text{Cos} = \frac{\sum_{i=1}^{D} u_i \times v_i}{\sqrt{\sum_{i=1}^{D}(u_i)^2 \times \sum_{i=1}^{D}(v_i)^2}}$$

One example of a lexical similarity score may be calculated, as follows:

$$LEX(S_1, S_2) = \frac{LCSR(S_1, S_2)}{ED(S_1, S_2)}$$

$$LCSR(S_1, S_2) = \frac{LCS(S_1, S_2)}{\text{Max}(|S_1|, |S_2|)}$$

where LCSR refers to the Longest Common Subsequence Ratio, and LCS refers to Longest Common Subsequence between the strings that are analyzed. ED is the edit distance.

One example of a phonetic similarity score may be calculated, as follows:

$$PHON = 1 - \frac{ED(mPhon(S_1), mPhon(S_2))}{\text{Max}(|S_1|, |S_2|)}$$

where mPhon is the Metaphone score. In one embodiment, an unsupervised machine learning language model may be used to further control the fluency of the normalized output. For example, the machine learning model may use statistical or neural language models. The unsupervised machine learning model may then decode the optimal path based on the similarity scores and the language model probabilities, and encode the sentence, along with the various normalization candidates, in the HTK Standard Lattice Format. The lattice-tool toolkit may then be utilized to decode a set of potential paths using a Viterbi decoding algorithm.

Without limitation, the unsupervised machine learning model is not limited to identifying individual lexemes. In one embodiment of the present disclosure, the unsupervised machine learning model implements instructions for identifying phrases and sub-lexeme units. Detecting and identifying phrases may involve one or more methods outlined above and additionally use a data-driven approach for learning the phrases within corpora. For example, phrase candidates with scores above a certain threshold are used as phrases. The lexemes within the phrases may be separated by a delimiter and considered as a single lexeme-like entity for any consequent analysis and further filtered for punctuation sequences, URLs, and social media jargon.

The neologism normalization system may additionally identify sub-lexemes through a data compression technique, which allows the neologism normalization system to utilize less computer-based memory. Here, the compression technique iteratively replaces the most frequent pair of bytes in a sequence with a single, unused byte and instead of merging frequent pairs of bytes, characters or character sequences are merged. The neologism normalization system initializes a symbol vocabulary with a character vocabulary, and represent each lexeme as a sequence of characters, plus a special end-of-lexeme symbol which allows the neologism normalization system to restore the original tokenization after translation. The neologism normalization system may iteratively count all symbol pairs and replace each occurrence of the most frequent pair for example, ('A', 'M') with a new symbol 'AM'. Each merge operation produces a new symbol which represents a character n-gram. Frequent character n-grams (or whole lexemes) are eventually merged into a single symbol. The final symbol vocabulary size is equal to the size of the initial vocabulary, plus the number of merge operations. The neologism normalization system can analyze an extracted text, wherein each lexeme is weighted by its frequency. Here, unlike previous methods, the neologism normalization system ensures symbol sequences are still interpretable as sub-lexeme units, which the network can generalize to translate and produce new lexemes (unseen at training time) on the basis of these sub-lexeme units. This methodology provides a significant improvement in the field of neologism normalization and improves the efficiency of storing data.

An important aspect to consider when combining the representations is to maintain the text's distributional properties. The neologism normalization system may combine the different lexeme representations through a random distribution, by having the choice to switch to a certain representation, for each lexeme, dictated through a random variable. That is, for a given sentence S in a corpus, and for each lexeme E S, the resulting representation based on the distribution is managed by the control variable c=rand($\alpha$), where $\alpha \in \{0, 1, 2, \ldots \}$. Each value represents a different representation level. This process is repeated for all the lexemes of each sentence k different times, so we end up with k different copies of the sentence, each having a randomly selected representation for all of its lexemes.

FIG. 1 depicts a flow diagram of an exemplary method of detecting and normalizing neologisms identified on an online platform. As shown in FIG. 1, method 100 comprises a step in which a neologism normalization system implements a comment moderation bot for detecting one or more user generated comments on a publisher platform (Step 102). For example, a comment moderation bot may aggregate content data (e.g., textual data) recited on an online platform (e.g., a webpage, social media timeline, audio/video/textual/augmented reality post) and transmit the aggregated content data to the neologism normalization system.

The neologism normalization system may then tokenize the received textual data (e.g., one or more user generated comments) received in the transmission from the comment moderation bot (Step 104). The neologism normalization system may further filter the textual data against known lexemes stored in a database and remove the known lexemes received in the textual data from further analysis (Step 106). The neologism normalization system may select a language (e.g., English) and audit the textual data for lexemes in order to identify and remove foreign (e.g., non-English) lexemes from further analysis (Step 108). The neologism normalization system may generate a list of remaining lexemes as a result of the filtered and audited textual data (Step 110). The neologism normalization system may also identify sub-lexemes from the list of remaining lexemes (Step 112). The neologism normalization system may then normalize the list of remaining lexemes through lattice decoding (Step 114) and store the normalized list of remaining lexemes in a neologism database (Step 116).

Figure 2:
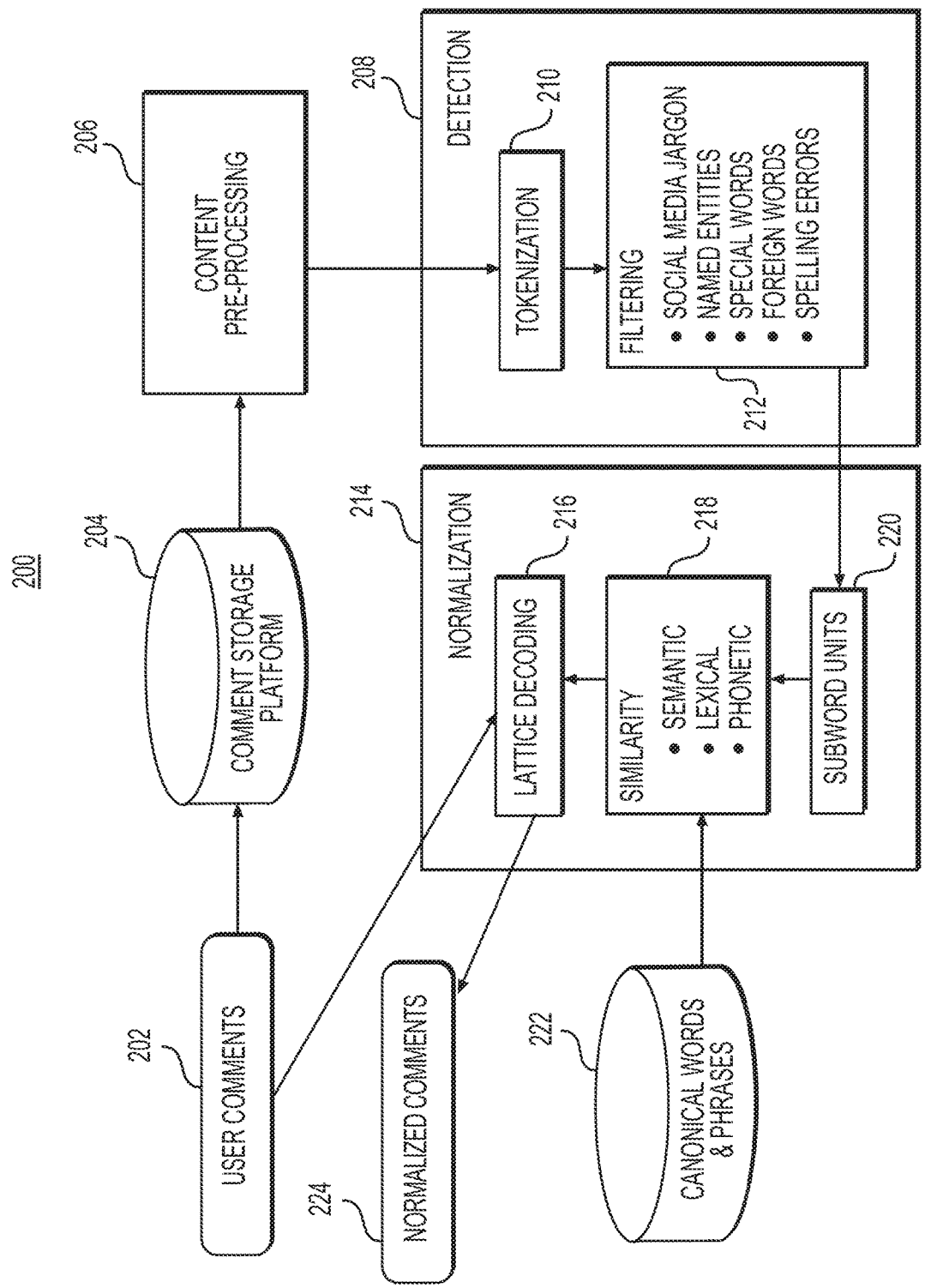
FIG. 2 depicts a block diagram of an exemplary method of a neologism normalization system detecting and normalizing neologisms identified on an online platform.

FIG. 2 depicts a block diagram of an exemplary method of a neologism normalization system 200 configured for detecting and normalizing neologisms identified on an online electronic content platform. As shown in FIG. 2, in one embodiment, a neologism normalization system 200 may comprise a comment storage platform 204, a content pre-processing module 206, a detection module 208, and a normalization module 214. As shown, neologism normalization system 200 may also access or retrieve user comments 202, transmit or store normalized comments 224, and access, store, and/or maintain a database of canonical words and phrases 222.

In one embodiment, user-generated comments (or alternatively content and textual data) 202 may be aggregated from any type of online electronic content platform and stored on a comment storage platform 204, for example, by a comment moderation bot. The user-generated comments may then be received by the content pre-processing module 206 for analysis of the type, volume, and origin of the user-generated comments. The detection module 208 may then receive the user-generated comments and implement instructions for tokenization at a tokenization module 210 and filtering at a filtering module 212 for filtering of the user comments. The tokenization module 210 may consist of executing code for implementing white space splits, and identifying Uniform Resource Locators and specific punctuation patterns. The filtering module 212 may analyze the received user-generated comments and perform techniques for named entities removal, wherein an algorithm analyzes the received aggregated text data packets and identifies relevant nouns (e.g., people, places, and organizations) that are mentioned in the text and further eliminates the named entities from the list; non-language (e.g., English) content removal, wherein code is executed for identifying and eliminating foreign (e.g., non-English) lexemes (e.g., phrases, tokens and words); social media jargon removal, wherein code is executed for accessing social media platform specific glossaries and identifying and removing known social media jargon; and the identification of spelling errors and the potential removal thereof.

In one embodiment, the user-generated comments that remain after tokenization at the tokenization module 210 and filtering at the filtering module 212 may then be received at the normalization module 214. Upon receipt of the user-generated comments, the normalization module 214 may implement instructions for subword unit analysis 220, for identifying phrases and sub-lexeme units. Detecting and identifying phrases may involve one or more methods outlined above and additionally use a data-driven approach for learning the phrases within corpora. Phrase candidates with scores above a certain threshold may be used as phrases.

The lexemes within the phrases may be separated by a delimiter and considered as a single lexeme-like entity for any consequent analysis by the similarity module 218. The similarity module 218 may receive a list of canonical forms from a canonical words and phrases database 222 for a particular language, (e.g. traditional English language lexica), like the Gigaword corpus. For example, as described above, neologisms may be expected to share semantic, lexical, and phonetic similarity with their canonical counterparts. As such, similarity module 218 may implement the following algorithms, including: semantic similarity, lexical similarity and phonetic similarity, for evaluating canonical words & phrases matching context with that of the identified neologisms. Thus, similarity module 218 may analyze the user comments against the canonical words and phrases in order to establish similarity metrics.

In one embodiment, the result(s) of the analysis by the similarity module 218 may then be received by the lattice decoding module 216, wherein for each canonical candidate, an unsupervised machine learning model may retrieve the N nearest neighbors from the neural lexeme embeddings. This effectively functions as a reversed normalization lexicon, where the canonical candidates are mapped to the potential neologisms. The canonical forms may be scored using several similarity metrics and the unsupervised machine learning model may then utilize reverse mapping techniques to get a list of scored canonical candidates for each neologism. The lattice decoding module 216 may generate a list of neologisms wherein the neologisms are further categorized as normalized comments 224.

Figure 3:
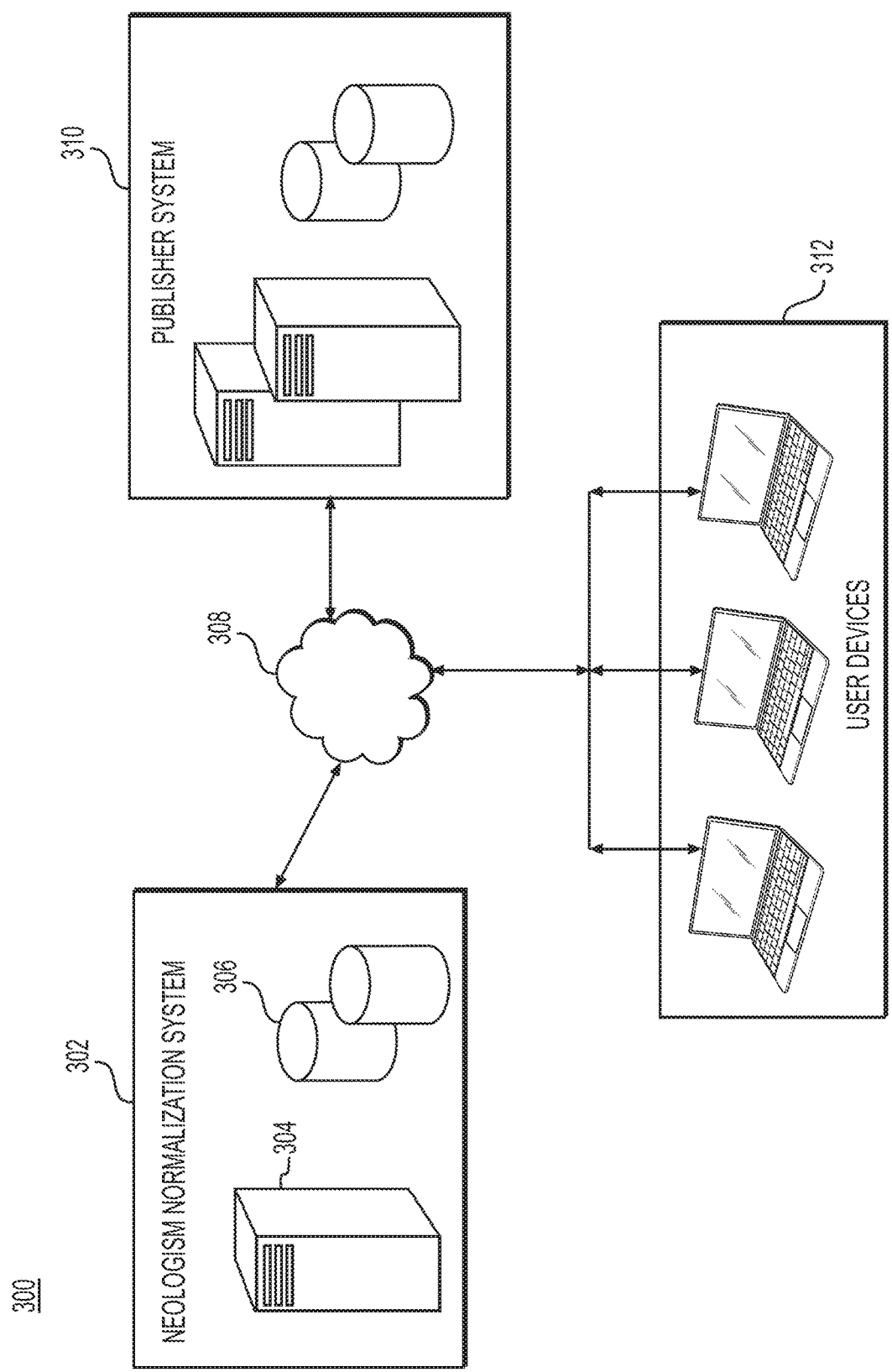
FIG. 3 depicts a schematic diagram of an exemplary method of detecting and normalizing neologisms identified on an online platform.

FIG. 3 depicts a schematic diagram of an exemplary method of detecting and normalizing neologisms identified on an online electronic content platform, according to an exemplary embodiment of the present disclosure. As shown in FIG. 3, the environment 300 may include at least one neologism normalization system, one or more publisher systems 310, and user devices 312, which may include laptop and desktop computers, Internet-enabled mobile devices, or any Internet-enabled device. An electronic network 308 may be, for example, the Internet, but may also be or comprise a Local Area Network ("LAN"), Wide Area Network (WAN), Wireless Local Area Network (WLAN), Metropolitan Area Network (MAN), and/or Storage Area Network (SAN), etc. A website (or a social media application/platform) may be hosted by a publisher system 310 so that it is made accessible to one or more user devices 312 and the neologism normalization system 302.

The neologism normalization system 302, which may be any type of distributed processing web servers and/or content delivery network (CDN), may be configured to monitor and/or intercept content data (e.g. audio, video, or textual data, and code thereof), through a comment moderation bot. The neologism normalization system 302 may comprise of one or more servers 304 and databases 306. Similarly, the one or more publisher systems 310 may comprise one or more web servers, communications servers, and databases. Further, steps of the methods depicted in FIGS. 1 and 2 may be practiced on any combination of the devices depicted in FIG. 3.

The aforementioned systems and methods may be implemented via any suitable system infrastructure. The following discussion provides a brief, general description of a suitable computing environment in which the present disclosure may be implemented. Although not illustrated, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers (e.g. smart watches, smart jewelry, smart medical devices, smart medical aids), all manner of cellular or mobile phones (including Voice over IP ("VoIP") phones), dumb terminals, media players, gaming devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor. However, some machine learning, deep learning and neural network environments may require more robust processing units; for example, an Application Specific Integrated Circuit (ASIC), Tensor Processing Unit (TPU) which may be assembled with 16 GB of high bandwidth memory and may be capable of delivering over 180 teraflop performance; or a Graphics Processing Unit (GPU). Some or all of the database(s) described herein, may comprise a cache, a buffer, a relational database, an active database, a matrix, a self-referential database, a table, a non-relational No-SQL system, an array, a flat file, a documented-oriented storage system, and the like.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. In a distributed computing environment, program modules may be located in both local and remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment", or "in an embodiment" in places throughout the specification are not necessarily all referring to the same embodiment. Furthermore, the particular features, structures, or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

It is intended that the specification and examples be considered as exemplary only, with a true scope and spirit of the disclosure being indicated by the following claims.

The invention claimed is:

1. A system for neologism normalization, the system comprising:
   a data storage device storing instructions and a processor configured to execute the instructions for:
      detecting one or more user generated comments on an electronic platform;
      tokenizing the one or more user generated comments;
      generating a list of lexemes by filtering the one or more user generated comments against known lexemes and removing the known lexemes from further analysis;
      identifying sub-lexemes from the list of lexemes;
      normalizing the list of lexemes through lattice decoding; and
      storing the normalized list of lexemes in a neologism database.

2. The system of claim 1, wherein tokenizing the one or more user generated comments includes executing code for implementing one or more of: creating white space splits, identifying Uniform Resource Locators, or identifying specific punctuation patterns.

3. The system of claim 1, wherein detecting one or more user generated comments on the electronic platform further comprises, scanning content retrieving lexical data for analysis.

4. The system of claim 1 further comprising: determining a type of content associated with the user generated comments.

5. The system of claim 1, wherein filtering the one or more user generated comments against known lexemes, further comprises identifying one or more of social media jargon, named entities, spelling errors, and abbreviations, in the one or more user generated comments.

6. The system of claim 1, wherein normalizing the list of lexemes through lattice decoding further comprises:
retrieving a list of known lexemes from a corpus and comparing the list of known lexemes to the list of lexemes and assigning a score to the lexemes in the list of known lexemes based on similarity metrics.

7. The system of claim 6, further comprising:
wherein comparing the list of known lexemes to the list of remaining lexemes further comprises comparing a type of lexemes in the list of known lexemes to the type of lexemes in the list of lexemes; and
wherein assigning a score to the lexemes in the list of known lexemes comprises analyzing the lexemes in the list of known lexemes for semantic similarity, lexical similarity and phonetic similarity, to lexemes in the list of lexemes.

8. A computer-implemented method for neologism normalization, the computer-implemented method comprising:
detecting one or more user generated comments on an electronic platform;
tokenizing the one or more user generated comments;
filtering the one or more user generated comments against known lexemes stored in a database and removing the known lexemes from further analysis;
generating a list of lexemes as a result of the filtered one or more user generated comments;
identifying sub-lexemes from the list of lexemes;
normalizing the list of lexemes through lattice decoding; and
storing the normalized list of lexemes in a neologism database.

9. The computer-implemented method of claim 8, wherein tokenizing the one or more user generated comments includes executing code for implementing one or more of: creating white space splits, identifying Uniform Resource Locators, or identifying specific punctuation patterns.

10. The computer-implemented method of claim 8, wherein detecting one or more user generated comments on the electronic platform further comprises, scanning content retrieving lexical data for analysis.

11. The computer-implemented method of claim 8, further comprising:
determining a type of content associated with the user generated comments.

12. The computer-implemented method of claim 8, wherein filtering the one or more user generated comments against known lexemes, further comprises identifying one or more of social media jargon, named entities, spelling errors, and abbreviations, in the one or more user generated comments.

13. The computer-implemented method of claim 8, wherein normalizing the list of lexemes through lattice decoding further comprises:
retrieving a list of known lexemes from a corpus and comparing the list of known lexemes to the list of lexemes and assigning a score to the lexemes in the list of known lexemes based on similarity metrics.

14. The computer-implemented method of claim 13, further comprising:
wherein comparing the list of known lexemes to the list of lexemes further comprises comparing a type of lexemes in the list of known lexemes to the type of lexemes in the list of lexemes; and
wherein assigning a score to the lexemes in the list of known lexemes comprises analyzing the lexemes in the list of known lexemes for semantic similarity, lexical similarity and phonetic similarity, to lexemes in the list of lexemes.

15. A non-transitory computer readable medium storing instructions that, when executed by a processor, cause the processor to perform a method for neologism normalization, comprising:
detecting one or more user generated comments on an electronic platform;
tokenizing the one or more user generated comments;
filtering the one or more user generated comments against known lexemes stored in a database and removing the known lexemes from further analysis;
generating a list of lexemes as a result of the filtered one or more user generated comments;
identifying sub-lexemes from the list of lexemes;
normalizing the list of lexemes through lattice decoding; and
storing the normalized list of lexemes in a neologism database.

16. The non-transitory computer readable medium of claim 15, wherein tokenizing the one or more user generated comments includes executing code for implementing one or more of: creating white space splits, identifying Uniform Resource Locators, or identifying specific punctuation patterns.

17. The non-transitory computer readable medium of claim 15, wherein detecting one or more user generated comments on the electronic platform further comprises, scanning content retrieving lexical data for analysis.

18. The non-transitory computer readable medium of claim 15, further comprising: determining a type of content associated with the user generated comments.

19. The non-transitory computer readable medium of claim 15, wherein normalizing the list of lexemes through lattice decoding further comprises:
retrieving a list of known lexemes from a corpus and comparing the list of known lexemes to the list of lexemes and assigning a score to the lexemes in the list of known lexemes based on similarity metrics.

20. The non-transitory computer readable medium of claim 19, further comprising:
wherein comparing the list of known lexemes to the list of lexemes further comprises comparing a type of lexemes in the list of known lexemes to the type of lexemes in the list of lexemes; and
wherein assigning a score to the lexemes in the list of known lexemes comprises analyzing the lexemes in the list of known lexemes for semantic similarity, lexical similarity and phonetic similarity, to lexemes in the list of lexemes.

* * * * *